United States Patent [19]

Hugentobler

[11] Patent Number: 5,582,730
[45] Date of Patent: Dec. 10, 1996

[54] COFFEE FILTER UNIT HAVING A FILTER BASKET AND A DETACHABLE DISTRIBUTING COVER

[76] Inventor: Max Hugentobler, Schwellistrasse 31, CH-8052 Zürich, Switzerland

[21] Appl. No.: 324,651

[22] Filed: Oct. 18, 1994

[30] Foreign Application Priority Data

Oct. 18, 1993 [CH] Switzerland ............... 03132/93

[51] Int. Cl.$^6$ ............................................. B01D 29/085
[52] U.S. Cl. .................. 210/474; 210/477; 210/482; 99/295; 99/305
[58] Field of Search ...................... 210/473, 474, 210/475, 476, 477, 482; 99/295, 305

[56] References Cited

U.S. PATENT DOCUMENTS

| 1,015,407 | 1/1912 | Selg | 210/477 |
| 1,889,543 | 11/1932 | Coors | 210/477 |
| 2,889,049 | 6/1959 | Hauser | 210/477 |
| 5,186,830 | 2/1993 | Rait | 210/474 |
| 5,190,653 | 3/1993 | Herrick et al. | 210/477 |

FOREIGN PATENT DOCUMENTS 486233  4/1970  Switzerland.

*Primary Examiner*—W. L. Walker
*Attorney, Agent, or Firm*—Speckman, Pauley & Fejer

[57] ABSTRACT

A filter unit for brewing filtered coffee which uses basket filter bags. A special design of the filter openings of the basket filter assures an even discharge of the brewed coffee. Hot water is poured into a special distributing cover which is placed on the filter basket. Suitably designed distributing holes cause the hot water to form drops and distribute the hot water evenly over the entire amount of powdered coffee in the basket filter bag. The brewing and filtering operation is performed continuously and evenly because of these distributing holes, and thus the quality of the filtered coffee is improved.

17 Claims, 3 Drawing Sheets

COFFEE FILTER UNIT HAVING A FILTER BASKET AND A DETACHABLE DISTRIBUTING COVER

BACKGROUND OF THE INVENTION

1. Field of the Invention

This invention relates to a filter unit for brewing filtered coffee with a filter basket which is designed to receive basket filter bags and having a basket bottom supplied with filter openings.

2. Description of Prior Art

Filter units with basket filter bags are used today primarily in the restaurant business. Such filter units are particularly suited for brewing large amounts of filtered coffee at one time, something which is not possible with the cone-shaped filter units used today in private homes.

A filtering device for brewing filtered coffee which has a filter basket for receiving basket filter bags is known from Applicant's Swiss Patent CH 486 233. The filter basket has a bottom which is provided with ring-shaped grooves. Filter openings are positioned at regular distances in the ring-shaped grooves. Depressions are located between drip holes on the underside of the bottom. A bottom with such grooves and depressions aids the formation of drops at the filter openings.

Other known filtering devices have a great disadvantage in that the flow of the processed coffee out of the filter unit into a container does not occur continuously. In these devices, as the water level in the filter basket falls below a certain level, the outflow of water begins to slow or even stops. This problem was partially solved with the above mentioned patent.

A further problem arises during the pouring of hot water into the filter unit with the basket filter bag. Because these filter units are shaped like a cylinder or truncated cone, the water is distributed as a function of the pouring location and the pouring speed. In the process, powdered coffee is forced along and generally deposited unevenly on the walls of the basket filter bag. Often, a depression forms in the powdered coffee above the bottom of the basket filter bag because of the coffee that has floated away. These problems also have an effect on the flow of coffee out of the filter unit, and generally lower the quality of the filtered coffee. The uneven distribution of the powdered coffee plays a considerably greater role in connection with filter units of smaller size for the private household. For this reason, such filter units have not gained wide acceptance in private households.

SUMMARY OF THE INVENTION

It is one object of this invention to provide a filter unit for use with basket filter bags which improves the inflow of the water as well as the outflow of the coffee and in this way increases the quality of the brewed filtered coffee.

The above and other objects of this invention are achieved with a filter unit for brewing filtered coffee in which a filter basket is designed to receive basket filter bags, and has a basket bottom which forms a plurality of openings. The filter basket has a releaseably attached distributing cover which distributes the water poured into the filter basket. The filter basket preferably has a bottom with depressions that each contain a filter opening.

An additional advantage of this invention is that a functionally efficient filter unit according to this invention can be produced not only as a large model for commercial use, but also as a smaller model for household use.

The filter unit in accordance with preferred embodiments of this invention will be described below in connection with the drawings.

DESCRIPTION OF PREFERRED EMBODIMENTS

Figure 1:
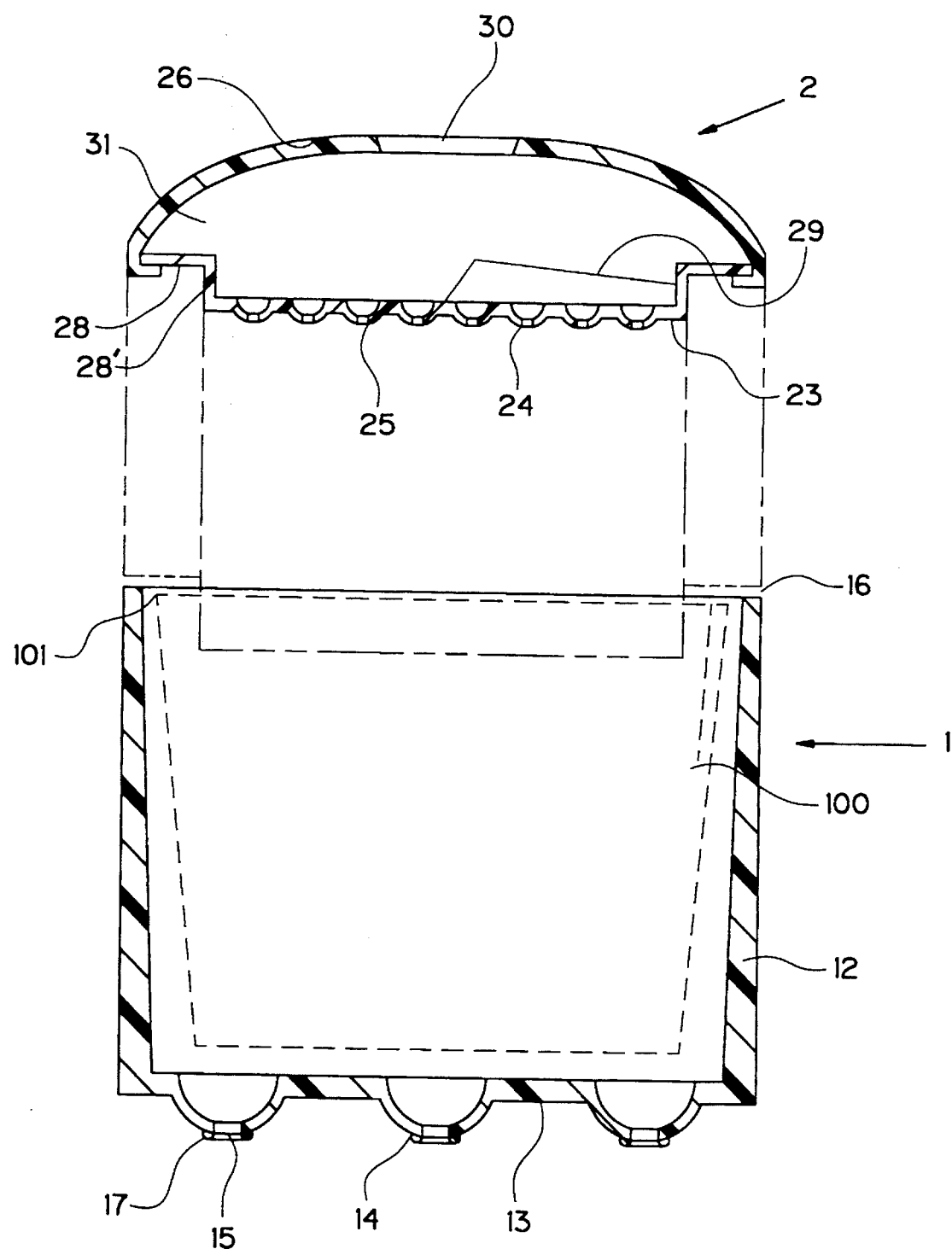
FIG. 1 shows a cross-sectional view of a filter unit with the distributing lid lifted in accordance with one preferred embodiment of this invention.

A filter unit for brewing coffee having a filter basket 1 with an installed basket filter bag 100 and a distributing cover 2 is shown in cross section in FIG. 1.

The filter basket 1 has lateral walls 12 and a bottom 13. The filter basket 1, according to one preferred embodiment of this invention, has a cylindrical shape and is closed off by the bottom 13. According to another preferred embodiment of this invention, the filter basket 1 has the shape of a truncated cone, wherein the smaller base of the cone forms the bottom 13. The lateral walls 12 on an upper circumferential rim form a shoulder 16 on which the distributing cover 2 can be placed. The bottom 13 forms a number of filter openings 15. In accordance with one preferred embodiment of this invention, each filter opening 15 is positioned in a depression 14 of the bottom 13 and is located at the lowest point of the depression 14. The depressions 14 are hemispherically or conically shaped downward extending protuberances formed in the basket bottom 13. Each filter opening 15 can be framed by a small bead to form a drip edge 17. The drip edge 17 extends downward from the bottom 13 or respectively from the depression 14. In one preferred embodiment of this invention, the bottom 13 is flat, and the filter openings 15 are enclosed by a drip edge 17.

In the course of filtering the coffee, the discharged coffee collects in the depressions 14, after which it begins to flow downward through the filter openings 15. A drop is formed on the underside of the depressions 14 below the filter opening 15. The drip edge 17 additionally supports the drop formation. The drop is held on the drip edge 17 until it has reached a certain size, then detaches itself and falls down. In the process, the drop aspirates another drop of coffee into the depression 14 and the dripping process begins anew. This continuous drop formation assures the even and complete discharge of the coffee from the filter basket 1. It is not the weight of the coffee in the filter basket 1 which is important, but the suction which is generated by each individual drop in the filter opening 15 and in the depressions 14.

Figure 2:
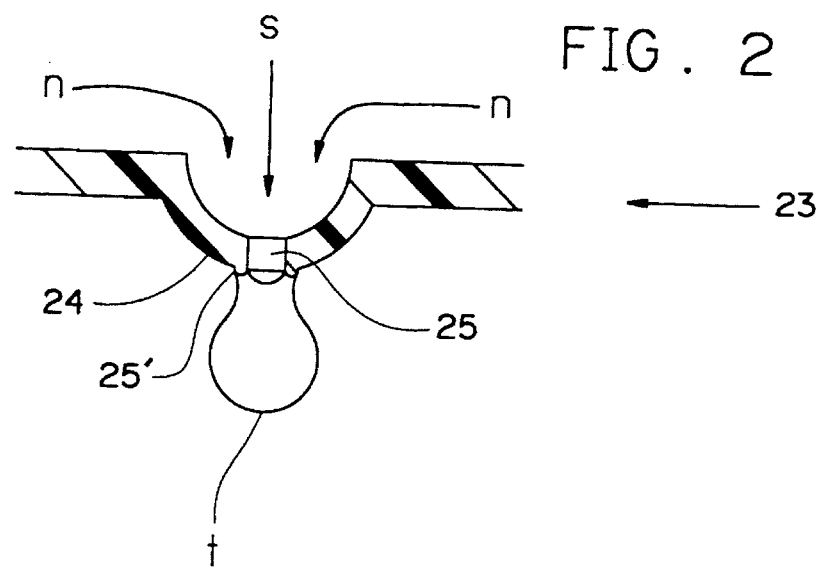
FIG. 2 is a cross-sectional view of a portion of the distributing bottom in accordance with one preferred embodiment of this invention.
Figure 3:
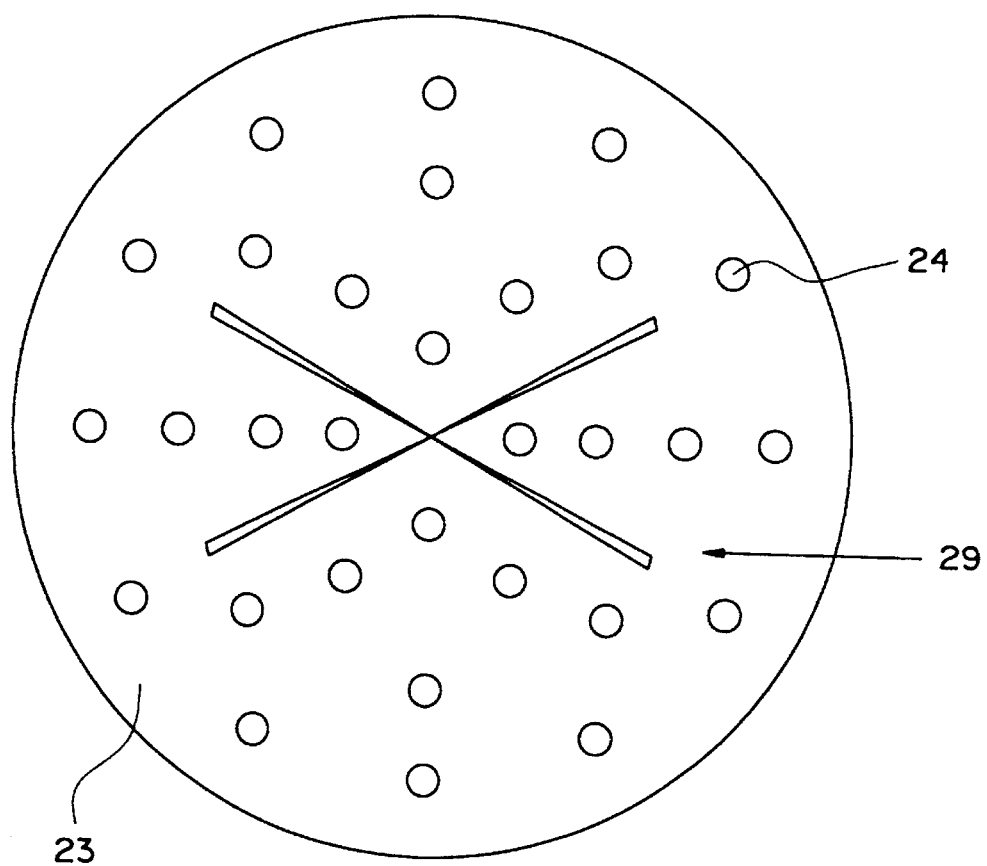
FIG. 3 is a top view of the distributing bottom in accordance with one preferred embodiment of this invention.

The distributing cover 2 has a distributing bottom 23 which forms a circumferential resting edge 28 and a shoulder 28'. When placed upon the filter basket 1, the distributing bottom 23 projects slightly into the filter basket 1, and inside the basket filter bag 100. Resting edge 28 rests on the shoulder 16 of the filter basket 1. Thus, the upper edge 101 of the basket filter bag 100 is lightly held between the distributing bottom 23 and the lateral wall 12 of the filter basket 1 in the area of the shoulder 28' of the distributing cover 2. The distributing bottom 23 is covered by a covering 26 in such a way that a hollow chamber exists between the distributing bottom and the covering 26. This hollow chamber is used as a distributing space 31 for distributing the water. A pouring opening 30 for pouring in hot water is located in the center of the covering 26. The distributing bottom 23 forms a number of distributing holes 25 similar to a shower head. However, the distributing holes 25 are either enclosed on the underside of the distributing bottom 23 by a drip edge 25' or they are positioned in a depression 24. The depressions 24 are hemispherically or conically shaped downward protuberances of the distributing bottom 23. In a preferred embodiment, each of the distributing holes 25 is positioned in a depression 24 and is additionally enclosed by a drip edge 25' as the cross-sectional view in FIG. 2 shows. The drip edges 25' extend downward on the underside of the distributing bottom 23 of the depressions 24. In addition, guide elements 29 can be positioned on the distributing bottom 23 in the distributing space 31, for guiding the inflowing water to the distributing holes 25, as can be seen in the top view of the distributing bottom 23, as shown in FIG. 3, for example.

The distributing cover 2 operates as follows. Hot water is poured through the pouring opening 30 into the distributing space 31. The water is distributed over the entire distributing bottom 23 and starts to fill the distributing holes 25, where drops are formed. The drop formation, as described in connection with the bottom 13 of the filter basket 1, takes place here in an analogous manner. Thus, the hot water does not freely flow directly into the powdered coffee. A forceful shower spray effect is also prevented by the distributing bottom 23. Instead, the hot water drips evenly over the entire surface of the powdered coffee in the basket filter bag 100. The brewing process proceeds evenly because it is not affected by a flow of hot water. Also, the powdered coffee is not washed up against the wall of the basket filter bag 100. In addition, the covering 26 of the distributing cover 2 prevents the water that is poured into the distributing cover 2 from cooling prematurely. The outflow of the brewed coffee occurs as described above. The distributing cover 2 is lifted off the filter basket 1, and the basket filter bag 100 with the powdered coffee remains is removed from the filter basket 1.

Figure 4:
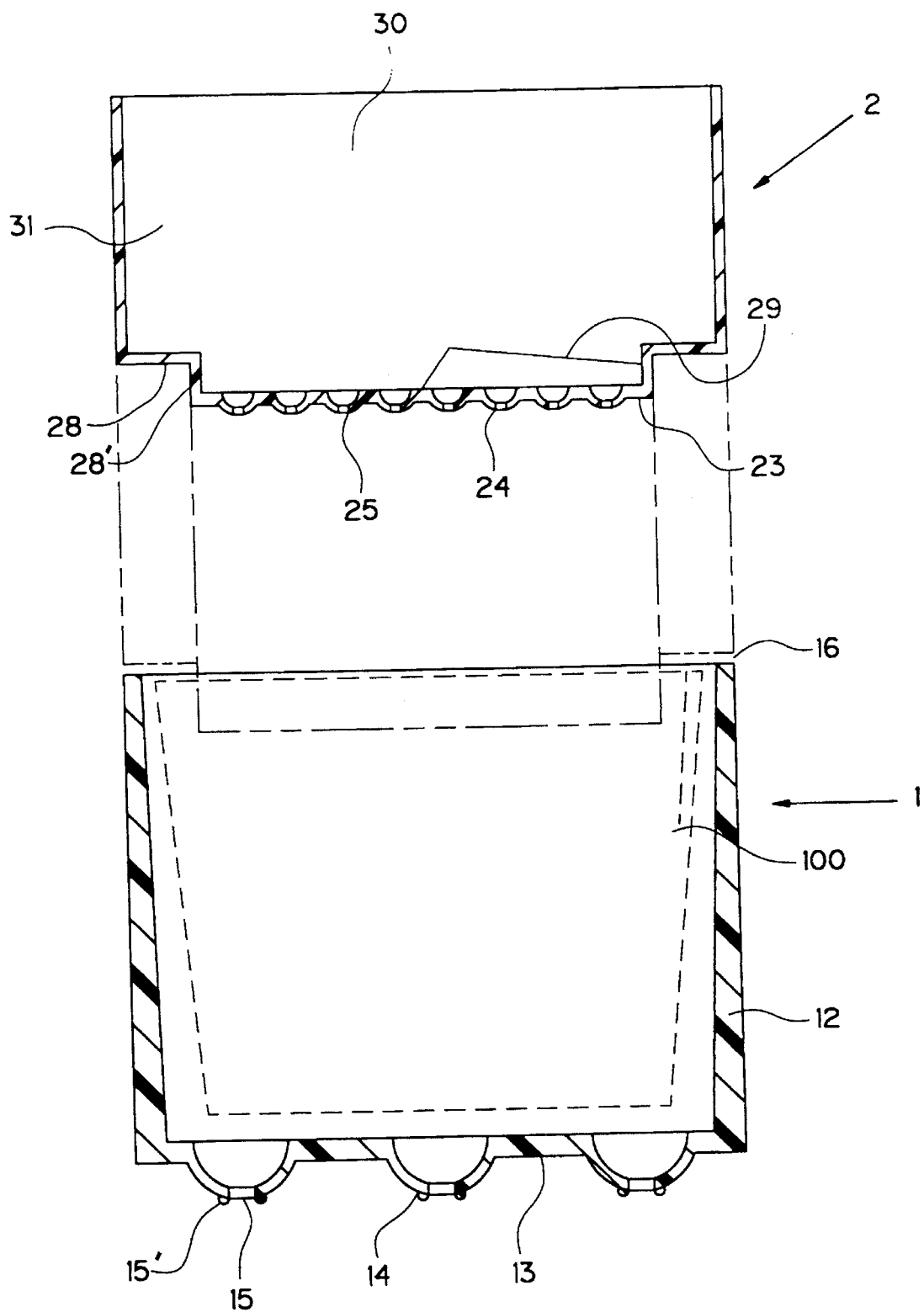
FIG. 4 shows a filter unit with another preferred embodiment of the distributing cover.

Another embodiment of the distributing cover 2 of this invention is shown in FIG. 4. In this embodiment the distributing cover 2 does not have a covering 26. The distributing cover 2 is open at the top and has the shape of a container that is open at the top. As described above, the hot water is poured in from the top, where it is distributed over the distributing bottom 23 and drips downward through the distributing holes 25. This embodiment has one disadvantage in that the hot water cools sooner by dissipating its heat upward into the surrounding air.

I claim:

1. In a filter unit for brewing filtered coffee, the filter unit having a filter basket (1) with a basket bottom (13) which forms a plurality of filter openings (15), the improvement comprising a detachable distributing cover (2) having a distributing bottom (23), the distributing bottom (23) forming a plurality of distributing holes (25), each of the distributing holes being positioned with a first depression (24), each of the distribution holes (25) being rimmed by a drip edge (25'), a covering (26) forming a pouring opening (30) and extending over the distributing bottom (23), the distributing bottom (23) and the covering (26) forming a distributing space (31) therebetween, and the distributing cover (2) mounted on the filter basket (1).

2. In a filter unit in accordance with claim 1, wherein the basket bottom (13) forms a plurality of second depressions (14), and each of the second depressions (14) forms one of the filter openings (15).

3. In a filter unit in accordance with claim 2, wherein each of the second depressions (14) are generally hemispherically shaped and downwardly directed protuberances.

4. In a filter unit in accordance with claim 2, wherein each of the second depressions (14) are in a general shape of a truncated cone.

5. In a filter unit in accordance with claim 1, wherein each of the first depressions (24) are in a general shape of a truncated cone.

6. In a filter unit in accordance with claim 5, wherein at least one guide element (29) for guiding the flow of water is positioned in the distributing space (31).

7. In a filter unit in accordance with claim 1, wherein each of the first depressions (24) are generally hemispherically shaped and downwardly directed protuberances.

8. In a filter unit in accordance with claim 1, wherein a shoulder (28') is positioned on a circumferential portion of the distributing bottom (23), a periphery of the filter basket (1) supports the shoulder (28') so that the distributing bottom (23) projects into the filter basket (1), and the shoulder (28') and a lateral wall (12) of the filter basket (1) support an upper edge portion (101) of a basket filter bag (100).

9. In a filter unit for brewing filtered coffee, the filter unit having a filter basket (1) with a basket bottom (13) which forms a plurality of filter openings (15), the improvement comprising a detachable distributing cover (2) having a distributing bottom (23), the distributing bottom (23) forming a plurality of distributing holes (25), a covering (26) forming a pouring opening (30) and extending over the distributing bottom (23), the distributing bottom (23) and the covering (26) forming a distributing space (31) therebetween, the distributing cover (2) mounted on the filter basket (1);

the basket bottom (13) forming a plurality of first depressions (14), and each of the first depressions (14) forming one of the filter openings (15);

each of the first depressions (14) being generally hemispherically shaped and downwardly directed protuberances; and a drip rim (17) surrounding each of the filter openings (15), and the drip rim (17) extending downward from the basket bottom (13).

10. In a filter unit for brewing filtered coffee, the filter unit having a filter basket (1) with a basket bottom (13) which forms a plurality of filter openings (15), the improvement comprising:

a detachable distributing cover (2) having a distributing bottom (23), the distributing bottom (23) forming a plurality of distributing holes (25) and enclosed by an upwardly extending lateral wall (12), each of the distributing holes being positioned with a depression (24), each of the distributing boles.(25) rimmed by a drip edge (25'), the distributing bottom (23) and the lateral wall (12) forming a distributing space (31) and a pouring opening (30) above the distributing bottom (23) and the distributing cover (2) mounted on the filter basket (1).

11. In a filter unit in accordance with claim 10, wherein a shoulder (28') is positioned on a circumferential portion of the distributing bottom (23), a periphery of the filter basket (1) supports the shoulder (28') so that the distributing bottom (23) projects into the filter basket (1), and the shoulder (28') and a lateral wall (12) of the filter basket (1) support an upper edge portion (101) of a basket filter bag (100).

12. In a filter unit in accordance with claim 10, wherein at least one guide element (29) for guiding the flow of water is positioned in the distributing space (31).

13. In a filter unit for brewing filtered coffee, the filter unit having a filter basket (1) with a basket bottom (13) which forms a plurality of filter openings (15), the improvement comprising a detachable distributing cover (2) having a distributing bottom (23), the distributing bottom (23) forming a plurality of distributing holes (25), a coveting (26) forming a pouring opening (30) and extending over the distributing bottom (23), the distributing bottom (23) and the covering (26) forming a distributing space (31) therebetween, the distributing cover (2) mounted on the filter basket (1), and a drip rim (17) surrounding each of the filter openings (15), and the drip rim (17) extending downward from the basket bottom (13).

14. In a filter unit for brewing filtered coffee, the filter unit having a filter basket (1) with a basket bottom (13) which forms a plurality of filter openings (15), the improvement comprising:

- a detachable distributing cover (2) having a distributing bottom (23), the distributing bottom (23) forming a plurality of distributing holes (25), a covering (26) forming a pouring opening (30) and extending over the distributing bottom (23), the distributing bottom (23) and the covering (26) forming a distributing space (31) therebetween, the distributing cover (2) mounted on the filter basket (1); and
- a detachable distributing cover (2) having a distributing bottom (23), the distributing bottom (23) forming a plurality of distributing holes (25) and enclosed by an upwardly extending lateral wall (12), each of the distributing holes (25) rimmed by a drip edge (25'), the distributing bottom (23) and the lateral wall (12) forming a distributing space (31) and a pouring opening (30) above the distributing bottom (23), and the distributing cover (2) mounted on the filter basket (1), the distributing bottom (23) forming a plurality of second depressions (24), and each said second depression (24) forming one of the distributing holes (25).

15. In a filter unit in accordance with claim 14, wherein each of the second depressions (24) are generally hemispherically shaped and downwardly directed protuberances.

16. In a filter unit in accordance with claim 14, wherein each of the second depressions (24) are in a general shape of a truncated cone.

17. In a filter unit for brewing filtered coffee, the filter unit having a filter basket (1) with a basket bottom (13) which forms a plurality of filter openings (15), the improvement comprising a detachable distributing cover (2) mounted on the filter basket (1), the basket bottom (13) forming a plurality of first depressions (14), each of the first depressions (14) forming one of the filter openings (15), a peripheral bead forming a rounded drip edge (17) positioned about each of the filter openings (15), and the peripheral bead (17) extending outward from the basket bottom (13).

\* \* \* \* \*